(12) United States Patent
Nichols et al.

(10) Patent No.: US 6,351,688 B1
(45) Date of Patent: Feb. 26, 2002

(54) ITEM DISPENSING SYSTEM

(75) Inventors: David F. Nichols; Joseph C. Perin, Jr., both of Cincinnati; David G. Wagoner, Loveland, all of OH (US)

(73) Assignee: Interlott Technologies, Inc., Mason, OH (US)

( * ) Notice: Subject to any disclaimer, the term of this patent is extended or adjusted under 35 U.S.C. 154(b) by 0 days.

(21) Appl. No.: 09/513,408

(22) Filed: Feb. 25, 2000

Related U.S. Application Data

(60) Continuation-in-part of application No. 09/325,082, filed on Jun. 3, 1999, now Pat. No. 6,038,492, which is a division of application No. 09/039,073, filed on Mar. 13, 1998, now Pat. No. 5,943,241.

(51) Int. Cl.[7] .............................................. G06F 17/00
(52) U.S. Cl. ................. 700/241; 700/244; 700/236; 705/21
(58) Field of Search .................. 221/2, 7, 8, 232, 221/233, 235; 700/236, 244; 705/21, 78, 241, 242

(56) References Cited

U.S. PATENT DOCUMENTS

| | | | |
|---|---|---|---|
| 1,979,613 A | 11/1934 | Goggins | |
| 3,140,009 A | 7/1964 | Wallace | |
| 3,892,948 A | 7/1975 | Constable | |
| 4,107,777 A | * 8/1978 | Pearson et al. | ............. 364/465 |
| 4,186,381 A | 1/1980 | Fleischer et al. | |
| 4,247,899 A | 1/1981 | Schiller et al. | |
| 4,473,884 A | 9/1984 | Behl | |
| 4,589,069 A | 5/1986 | Endo et al. | |
| 4,654,799 A | 3/1987 | Ogaki et al. | |
| 4,695,954 A | 9/1987 | Rose et al. | |
| 4,785,969 A | 11/1988 | McLaughlin | |
| 4,821,642 A | 4/1989 | Schafer | |
| 4,847,764 A | 7/1989 | Halvorson | |
| 4,858,806 A | 8/1989 | Schafer | |
| 4,982,337 A | 1/1991 | Burr et al. | |
| 4,995,507 A | 2/1991 | Schafer | |
| D319,264 S | 8/1991 | Schafer | |
| 5,100,038 A | 3/1992 | Schafer | |
| 5,111,939 A | 5/1992 | Schafer | |
| 5,128,862 A | 7/1992 | Mueller | |
| D329,877 S | 9/1992 | Schafer | |
| 5,207,368 A | 5/1993 | Wilfong, Jr. et al. | |
| 5,229,749 A | 7/1993 | Yenglin | |
| 5,282,127 A | * 1/1994 | Mii | ............................. 364/130 |
| 5,339,250 A | * 8/1994 | Durbin | ....................... 364/479 |
| 5,399,005 A | 3/1995 | Schafer | |
| 5,492,398 A | 2/1996 | Schafer | |

(List continued on next page.)

FOREIGN PATENT DOCUMENTS

WO      WO 99/46695      9/1999

*Primary Examiner*—Christopher P. Ellis
*Assistant Examiner*—Joe Dillon, Jr.
(74) *Attorney, Agent, or Firm*—Wood, Herron & Evans, L.L.P.

(57) ABSTRACT

An item dispensing system has a plurality of item dispensers at different retail locations. The item dispensers have processors for collecting data relating to the items dispensed. A host computer in electrical communications with processors in the item dispensers receives and stores the data relating to the items dispensed. A client computer in electrical communications with the host computer then receives the data relating to the items dispensed. Thus, the invention provides for the reporting of data relating to the items dispensed to a client computer via a host computer that collects the data from the item dispensers. The client computer is also capable of providing data to the item dispensers via the host computer. The invention is further applicable to a configuration which has a plurality of different client computers associated with different client systems, for example, different states. Thus, the invention is particular useful in reporting client item sales.

14 Claims, 8 Drawing Sheets

U.S. PATENT DOCUMENTS

| | | |
|---|---|---|
| 5,663,887 A | 9/1997 | Warn et al. |
| 5,694,326 A | 12/1997 | Warn et al. |
| 5,761,071 A | 6/1998 | Bernstein et al. |
| 5,819,981 A | 10/1998 | Cox |
| 5,912,818 A * | 6/1999 | McGrady et al. ...... 364/479.02 |
| 5,924,077 A * | 7/1999 | Beach et al. .................. 705/10 |
| 5,927,541 A | 7/1999 | Stoken et al. |
| 5,943,241 A | 8/1999 | Nichols et al. |
| 5,963,452 A * | 10/1999 | Etoh et al. ............. 364/479.06 |
| 5,983,197 A * | 11/1999 | Enta ............................ 705/16 |
| 5,997,170 A * | 12/1999 | Brodbeck .............. 364/479.06 |
| 6,038,492 A | 3/2000 | Nichols et al. |

* cited by examiner

US 6,351,688 B1

ITEM DISPENSING SYSTEM

This application is a continuation-in-part application of U.S. Ser. No. 09/325,082, filed Jun. 3, 1999 now 6,038,492, for an Item Dispensing System, which is a divisional application of U.S. Ser. No. 09/039,073, filed Mar. 13, 1998, for an Item Dispensing System, now U.S. Pat. No. 5,943,241.

FIELD OF THE INVENTION

This invention relates generally to the field of dispensing systems and more particularly, to an improved item dispensing system.

BACKGROUND OF THE INVENTION

State sponsored lotteries are a popular and accepted method of generating revenue in place of, or in addition to, taxes. One form of lottery uses instant lottery tickets on which number combinations are preprinted before distribution, thereby permitting the player to immediately view the ticket and know whether he/she is a winner. One system of distributing instant lottery tickets is entirely clerical with the tickets being stored in a drawer and counted out by hand. The clerk typically is responsible for keeping track of the number of tickets sold, making redemption payments and providing such sales and payout information to the state. The state then pays the store owner a commission or other monies due. Such a system has the disadvantages of being completely manual and requiring clerical assistance for the entire transaction. Further, the system has no significant security and is susceptible to shrinkage, that is, theft and accounting errors that result in lost revenue and tickets.

Another system for distributing instant lottery tickets is the individual ticket vending machine, which is a stand-alone, unattended automated ticket dispenser. The vending machine accepts the customer's cash or credit card payment and provides a selection of lottery tickets corresponding to the payment. The customer then makes various ticket selections having a value equaling the payment. The vending machine monitors the ticket selections and dispenses the lottery tickets selected by the customer. Such a vending machine has the advantages of not requiring the attention of a clerk, being very secure, and providing a high level of reporting by keeping track of how often the machine is accessed to be loaded and serviced, when and how much money is collected, when and which tickets have been selected, etc. The vending machine may also include a printer for printing reports of machine activity. While the above vending machine has many advantages over the clerical method of distributing instant lottery tickets, it has several disadvantages.

First, many retail establishments have several ticket vending machines which may be either stand-alone machines or machines requiring a clerical facilitation in the sale of tickets. Even though each of the machines has a ticket inventory and sales reporting capability, all of that reporting must be manually collected from each of the machines which is labor intensive and time consuming.

Further, it is necessary for such reporting to be supplied to a state administrative agency, for example, a state lottery commission. It is known that individual ticket vending machines can be connected directly to a central computer at the state agency, so that all of the reporting can be directly transferred to the state agency at any time and with a high level of security. While such systems are technically possible, as a practical matter, they are not often implemented. Providing electrical communications between a state central computer and each of the thousands of ticket vending machines in a state is a difficult, complex and costly task that requires continuing maintenance and management. It is a task that neither the retailer nor the state have any incentive to underwrite or undertake. Further, any communications connection into the ticket dispensing machine has the possibility of conflicting with and complicating service agreements that the state authority has with vendors of the ticket dispensing machines. Vendors of such machines often lease the machines to the states and maintain a communications link with the machine for maintenance and reporting purposes.

Therefore, there is a need to provide a ticket dispensing system that is more convenient to the retailer and provides the retailer with the capability of consolidating the reporting requirements at a central location. Further, there is a need for a ticket dispensing system that facilitates automated reporting to a state authority that administers a state-wide ticket dispensing operation.

SUMMARY OF THE INVENTION

The present invention provides an item dispensing system that automates and simplifies the reporting of item dispensing information. The present invention provides a distributed system that facilitates the transmission, processing and reporting of information relating to item dispensing and sales. The present invention is especially suitable for those installations in which a vendor of the item dispensers has an obligation of servicing the item dispensers and also has an interest in collecting data relating to the items dispensed. The dispensing system of the present invention has the advantage of combining the needs of a servicing agent and a client or customer of the vendor into a single, distributed data collection and reporting system.

According to the principles of the present invention in accordance with one presently preferred embodiment, an item dispensing system includes a plurality of item dispensers at different retail locations. The item dispensers have processors for collecting data relating to the items dispensed. A host computer in electrical communications with processors in the item dispensers receives and stores the data relating to the items dispensed. A client computer in electrical communications with the host computer receives the data relating to the items dispensed. Thus, the invention provides for the reporting of data relating to the items dispensed to a client via a host computer that collects the data from the item dispensers. The host computer is typically a third party computer which is servicing the item dispensers and hence, the client has real time access to the data without having to support a data collection network.

In one aspect of the invention, retailer computers are located at the retailer locations for collecting data from the item dispensers at respective retailer locations. In another aspect of the invention, there are a plurality of client computers; and the retailer locations, the host computer and the client computers are geographically remote from each other. In a still further aspect of the invention, the item dispensers are lottery ticket dispensers, and the client computers are associated with different states operating different lotteries.

In another embodiment of the invention, a method is provided for collecting data relating to item sales and dispensing from each of a plurality of item dispensers located at different retailer locations. The plurality of item dispensers have respective dispenser computers for collecting the data relating to item sales and dispensing. Next, data relating to item sales and dispensing is transferred from the dispenser computers at the different retailer locations to a host computer. The data relating to item sales and dispensing is stored at the host computer. Next, the data relating to item sales and dispensing is transferred from the host computer to a client computer.

These and other objects and advantages of the present invention will become more readily apparent during the following detailed description taken in conjunction with the drawings herein.

DETAILED DESCRIPTION OF THE INVENTION

Figure 1:
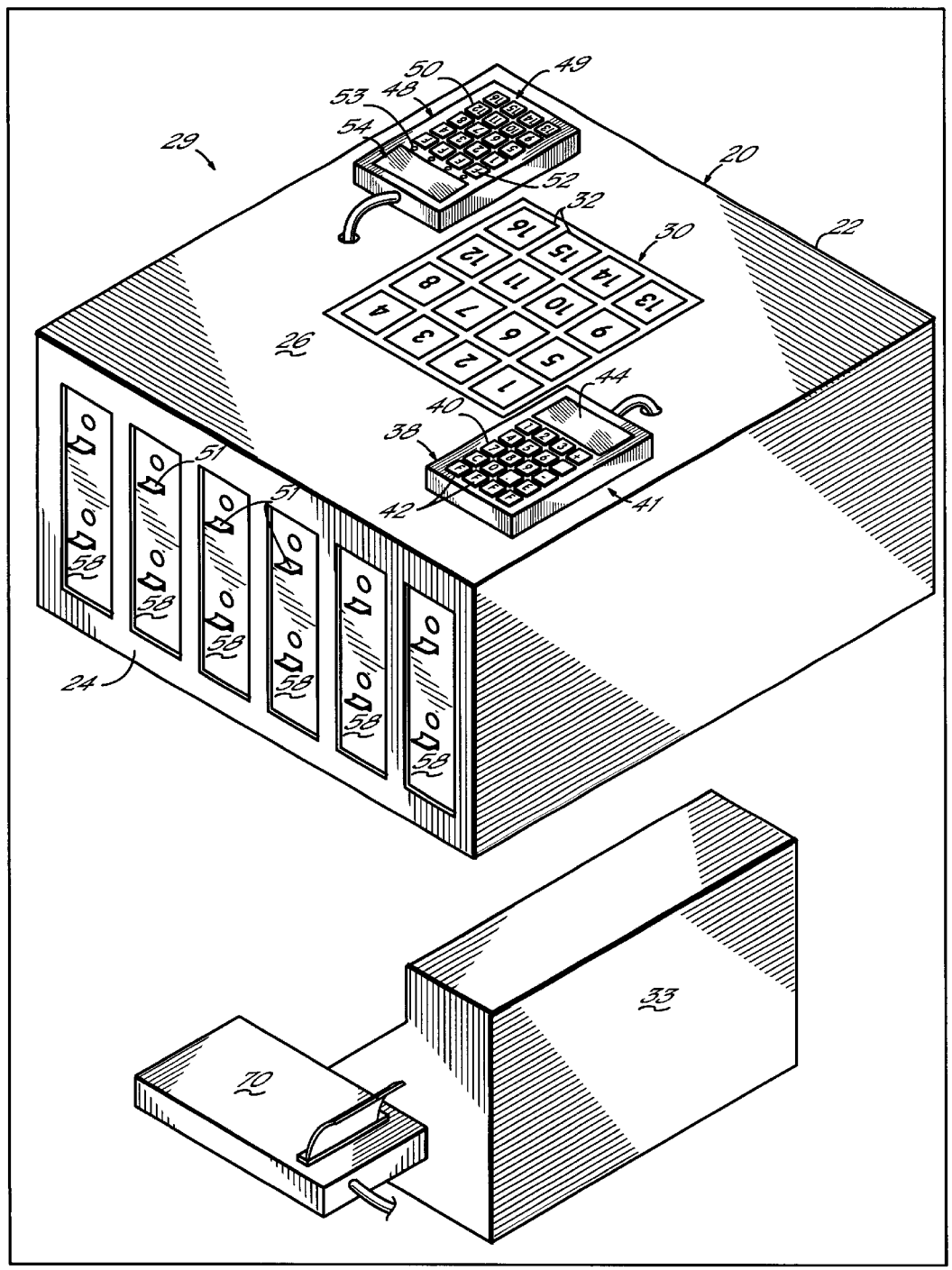
FIG. 1 is a partial perspective view of a counter having a ticket dispensing system in accordance with the principles of the present invention.

Referring to FIG. 1, a counter 20, for example, a point-of-sale retail checkout counter, has a customer side 22 and a retailer or clerk side 24. The counter 20 has an upper surface 26, which is normally a working surface on which items to be purchased are normally placed. In addition, point-of-sale displays and other items (not shown) are often placed on the working surface 26. A clerk standing on the retailer side 24 of the counter 20, scans or otherwise enters the items and their prices into a retailer point-of-sale terminal 33 and accepts the customer's payment for the goods by credit card or cash. In accordance with the present invention, an item dispenser 29 is integrated into the counter 20. In the example to follow, the item dispenser will be described as a gaming ticket dispensing system; however, as will be appreciated, the disclosed dispensing system may be used to dispense many different items that can be compactly stored in bulk, for example, other types of tickets, phone cards, stamps, cards or any other items capable of being relatively compactly inventoried and automatically dispensed.

A game display panel 30 is located on and normally removably attached to, the upper surface 26. The panel 30 has a predetermined number, for example, sixteen samples of game tickets 32, for example, instant lottery tickets displayed for view by the customer. The game ticket samples 32 are normally presented in the panel 30 in an attractive, easy to read display (such as in arrayed locations 1 through 16 shown in FIG. 1, as an example) so that the tickets catch the eye of the customer and clearly identify the game and its value.

If a customer desires to purchase game tickets, the customer pays the clerk with cash or credit card. The amount of the ticket purchase is entered by the clerk into the retailer terminal 33 and a retailer access module ("RAM") or unit 38. The retailer unit 38 is a self contained, stand-alone unit located at a first location with respect to the POS counter 20, for example, in the proximity of the retailer side 24 of the counter 20. The module 38 has an alphanumeric display 44 and an input device 41, for example, a keypad, with assorted numeric keys 40 and a selection of function keys 42 to facilitate the transaction. Upon entering the amount of the transaction in the module 38, the retailer module 38, in electrical communications with a customer access module ("CAM") or unit 48, transmits the payment value, that is, an available credit amount, to the customer module 48. The customer module 48 is a self contained, stand-alone unit located at a second location with respect to the POS counter 20 different from the first location. The customer module 48 is normally located proximate the customer side 22 of the counter 20 in a position convenient to the customer. The module 48 has an alphanumeric display 54 and an input device 49, for example, a keypad, with a number of numeric keys 50 corresponding to the number of displayed games 32 and nonnumeric function keys 52. Each of the numeric keys has an LED 53 next to the key, and illumination of the LED indicates that the game associated with that key may be played. Upon the available credit being displayed in display 54, utilizing the numeric keys 50, the customer selects the desired game tickets corresponding to the displayed game tickets 32. As each selection is made, one or more items or tickets 51 are dispensed from item or ticket dispensers 58 located at a third location with respect to the POS counter 20. The ticket dispensers 58 are normally located below the upper surface 26 of the counter 20 and oriented so that the tickets are dispensed toward the retailer side 24 of the counter 20. Thus, the dispensers 58 are normally located at a third location with respect to the counter 20 that is different from the first and second locations. After the tickets are dispensed, the remaining customer credit, that is, the amount of the purchase less the value of the item selected, is displayed in both the display 44 of the retailer module 38 and the display 54 of the customer module 48. Therefore, the customer can easily determine how many more tickets may be selected to equal the available credit. After all the tickets have been selected, the clerk then collects the dispensed tickets 51 from the dispensers 58 and gives the tickets 51 to the customer.

Figure 2:
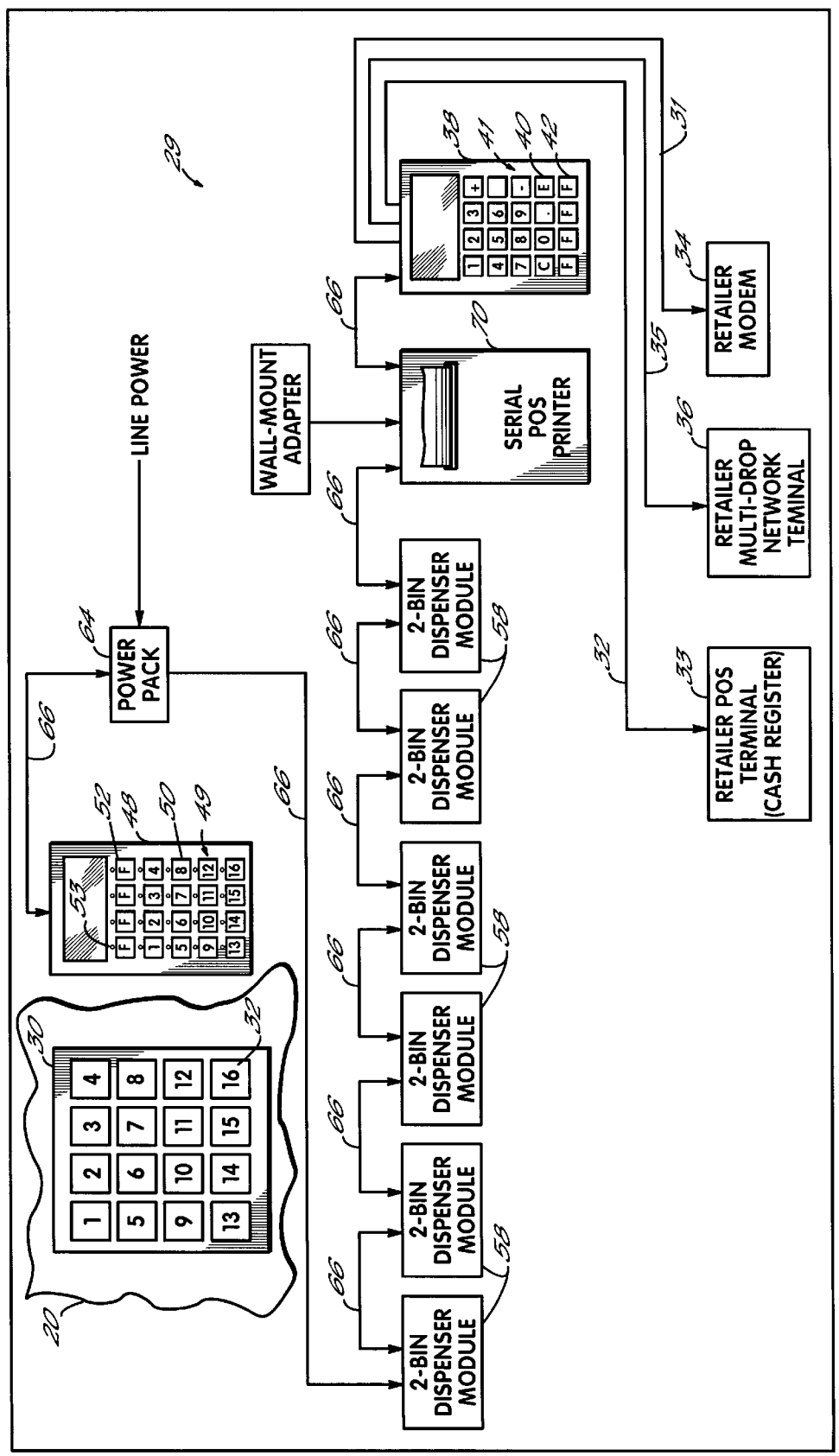
FIG. 2 is a schematic block diagram of the components of the ticket dispensing system illustrated in FIG. 1.

FIG. 2 is a schematic block diagram of the ticket dispensing system 29 illustrated in part in FIG. 1. Power is provided to the retailer and customer modules 38, 48, respectively, and the ticket dispensers 58 by a power supply 64. The power supply is designed to be connected to an AC power outlet normally found in retail establishments. Power is transferred to, and data is transferred between, the various components of the dispensing system 29 by means of cables 66, each of the cables 66 having eight conductors. The access modules 38, 48, ticket dispensers 58 as well as other components, for example, a serial POS printer 70, have pass through ports; and therefore, the cables may interconnect the components in a daisy chain manner, thereby providing complete modularity and scalability. With such a daisy chain architecture, any number of ticket dispensers 58 from one to the design maximum number, for example, 16, may be connected to the dispensing system 29 using the cables 66.

The power supply 64 provides an output DC voltage, for example, +15 VDC, which is supplied on two conductors of the eight conductor cables 66. One of the +15 VDC conductors is combined with a ground to form a first twisted pair. One conductor provides a serial data line and is combined with a ground to form a second twisted pair. Another conductor provides a serial clock line and is in a third twisted pair with a ground. The eighth wire is used to provide a signal from the dispensers 58 to the retail module 38 and is in a fourth twisted pair with the other +15 VDC line. For example, the dispensers 58 may provide a signal over the eighth wire indicating that a dispenser drawer or door is opened. Data is transferred across the cables 66 using a two wire "I²C-BUS" protocol from Phillips Semiconductors which is commercially available from Arrow Electronics of Centerville, Ohio. The "I²C-BUS" is a widely used, highly flexible and cost effective serial protocol that is often used in consumer electronics equipment and has been used in point-of-sale terminals. Under the protocol, data is transferred in packets between the retailer module 38 and customer module 48 and the dispensers 58. Data packet transfer occurs in response to commands and requests initiated by the retailer module 38.

Even though the retailer module 38, customer module 48 and dispensers 58 all have self-contained microprocessors, the retailer module 38 is the master control for the ticket dispensing system 29. The retailer module 38 provides initialization to the customer module 48 upon power up and further, provides ticket prices, ticket inventory and purchase amount to the customer module 48. Further, the retailer module 38 receives information relating to which keys the customer has pushed and provides instructions to the dispensers to dispense an appropriate number or selection of tickets.

Normally, the dispenser modules 58 include two separate storage and bursting mechanisms, that is, ticket dispensing mechanisms; and therefore, the illustrated six dispensers 58 provide the capability of dispensing tickets for twelve games. The ticket dispensers are substantially as described in U.S. Pat. No. 4,982,337 and PCT Application Serial No. PCT/US97/0576, each of which is assigned to the assignee of the present invention, and the entirety of both applications is incorporated by reference herein.

Figure 3:
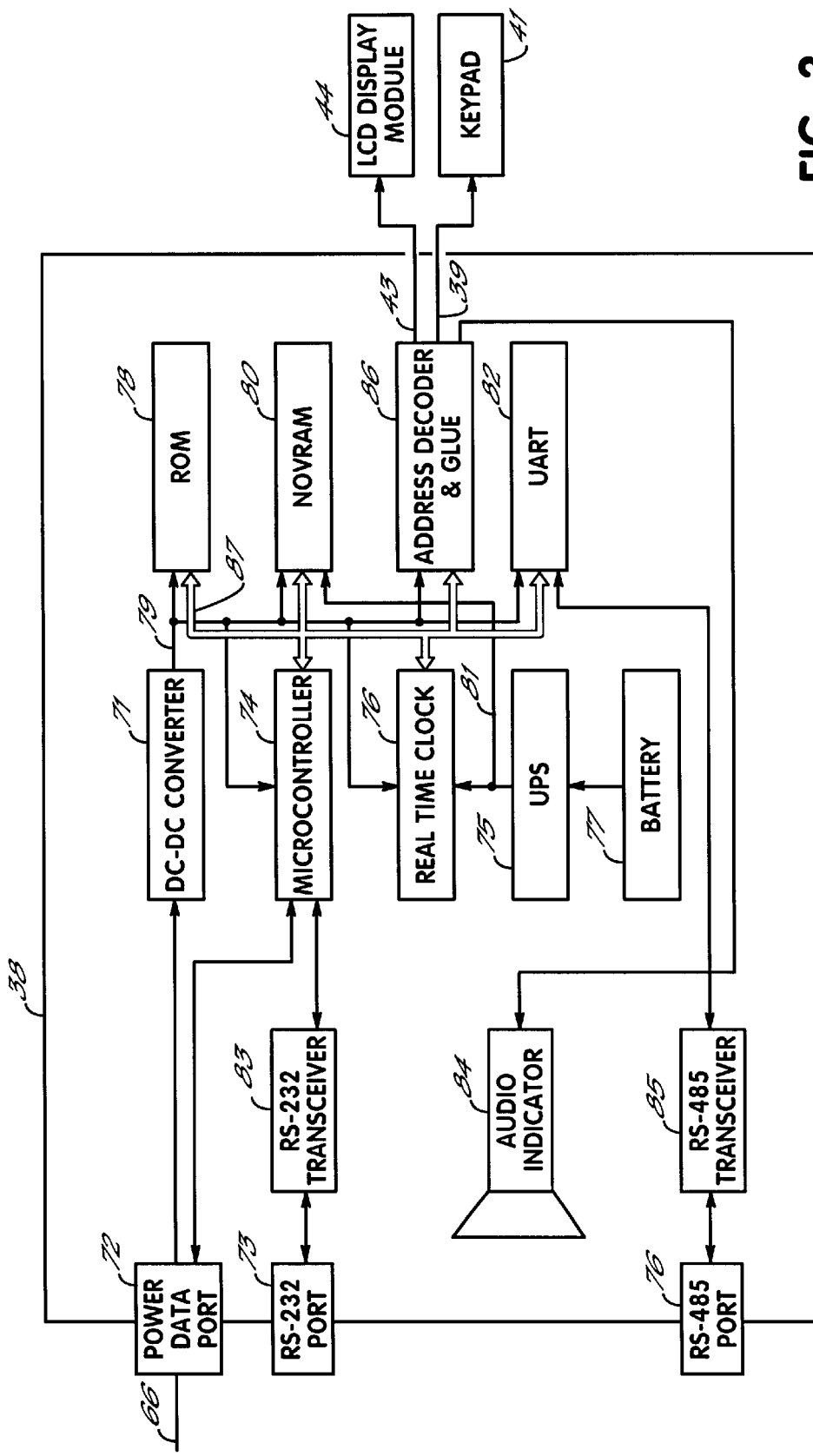
FIG. 3 is a detailed schematic diagram of a retailer access module in accordance with the principles of the present invention.

Referring to FIG. 3, the retailer access module 38 has a power/data port 72 connected to a cable 66, and RS-232 port 73 and an RS-485 port 76. The power conductors from the cable 66 are connected to a DC—DC converter 78. The DC—DC converter 78 has a first function of stepping down the +15 VDC to a lower level, for example, +5 VDC, with the appropriate regulation which is supplied to various components on power line 79. The power supply 64 of FIG. 2 provides the higher +15 VDC level across the cables 66 to reduce the current flow within the cables 66.

The retailer module 38 further includes a microprocessor 74, for example, Model No. 80C652 manufactured by Phillips Semiconductor and commercially available from Arrow Electronics of Centerville, Ohio. In addition, the module 38 includes a realtime clock 76, read-only memory ("ROM") 78, non-volatile random access memory ("NOVRAM") 80, a universal asynchronous receiver/transmitter ("UART") 82, an RS-232 transceiver 83, an RS-485 transceiver 85 and an audio indicator or speaker 84. The realtime clock 76 provides data and time information that is associated with a history of ticket sales. Thus, the ticket sales can be analyzed in reports by shift, by day, by week, etc. The retailer module 38 is electrically connected to the LCD display module 44 having two rows of 16 characters of display. An uninterruptable power supply 75 has a battery backup 77 and provides a continuous source of power on line 81 to the realtime clock 76 and the NOVRAM 80.

The retailer module 38 is also connected to the keypad 41 which includes 5 rows of keys 40 (FIG. 1) four columns wide that operate as 16 numeric keys and 4 nonnumeric function keys 42. An address decoder and glue circuit 86 receives input data on line 39 from the keypad 41 and provides output data on line 43 to the LCD display 44. The decoder and glue circuit 86 is a collection of digital and analog logic and interface circuitry that handles I/O functions to permit the microprocessor 74 to respond to and operate the display 44, keypad 41 and speaker 84. For example, the circuitry 86 decodes keystrokes from the keypad 41 into binary data that may be processed by the microcontroller 74. Further, the decoder circuit 86 receives binary data representing information to be displayed and converts that data to output signals that are appropriate for the LCD display 44. The decoder circuit 86 is also effective to provide audio output signals to the audio indicator or speaker 84, as required. The circuit 86 may be implemented using 7400 Series logic from Phillips Semiconductor, Inc. The controller 74, ROM 78, NOVRAM 80, address decoder 86 and UART 82 are interconnected by address, data and control buses 87 in a known manner. In addition, the realtime clock 76 is also connected to the data and control buses.

Figure 4:
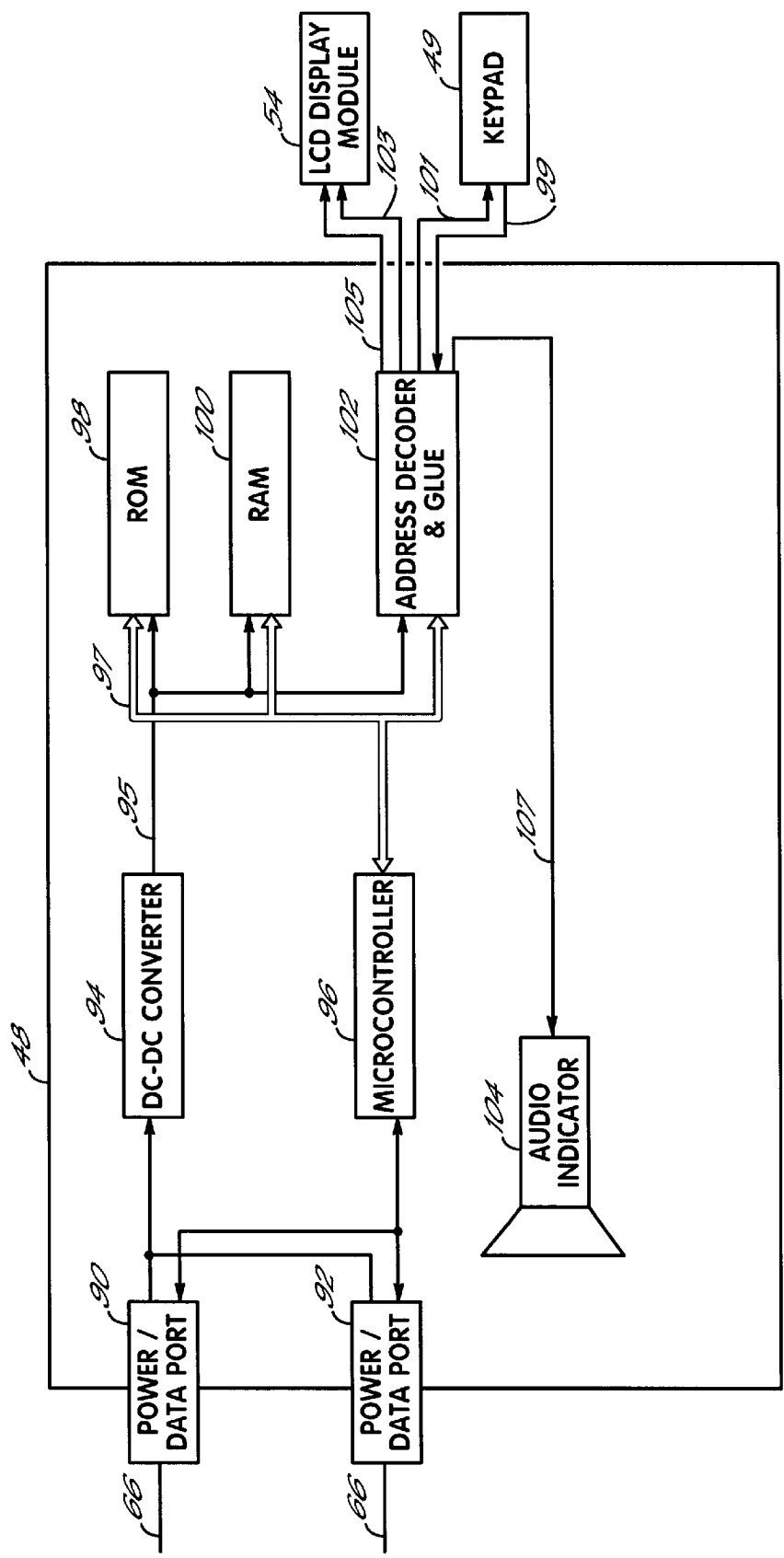
FIG. 4 is a detailed schematic diagram of a customer access module in accordance with the principles of the present invention.

Referring to FIG. 4, the customer access module 48 has a pair of pass-through power/data ports 90, 92 which are connected to the cables 66. A DC—DC converter 94 functions identically to the converter 71 of FIG. 3 and steps down the +15 VDC from the power supply 64 to +5 VDC. The +5 VDC is provided to the module components on power line 95. The customer module 48 includes a microcontroller 96 identical to the microcontroller 74 of the retailer module 38, ROM 98, RAM 100 and an address decoder and glue circuit 102. The microprocessor 96, ROM 98, RAM 100 and decoder circuit 102 are interconnected by address, data and control buses 97 in a known manner. The address decoder and glue circuit 102 handles the I/O functions associated with providing outputs to and receiving inputs from the display 54, keypad 49 and speaker 104. For example, the circuit 102 receives inputs on line 99 from a keypad 49 containing a 5 row by 4 column matrix of keys that provides 16 game keys 50 and 4 function keys 52. The decoder and glue circuitry 102 further provides output signals on line 101 to drive LEDs 53 associated with the keys on the keypad 49. In addition, the decoder and glue circuitry provides data on line 103 to the LCD display module 54 which is a 2 line by 16 character display. The decoder and glue circuitry 102 further provides power on line 105 to drive the illumination for backlighting the LCD display 54 and audio signals on line 107 to the audio indicator or speaker 104.

The retailer module 38, customer module 48 and ticket dispensers 58 are distributed in three different locations with respect to the counter 20; and the retailer module 38 and customer module 48 are being operated by different persons at different times. However, it is necessary that the process of purchasing game tickets, selecting game tickets and dispensing game tickets be carried out in a coordinated manner, which means under a central control. In the ticket dispensing system 29, the retailer module 38 is the master controller of the system. Since the retailer and customer modules 38, 48 are together performing most, if not all, of the same tasks that are currently being performed by integrated stand-alone ticket dispensers, the normal operation of the system will be described to the extent that the nature of the operations of the retailer and customer modules will be understood. It is not believed necessary to describe in detail every operation of the modules 38, 48 for one of ordinary skill to understand the present invention.

Figure 5:
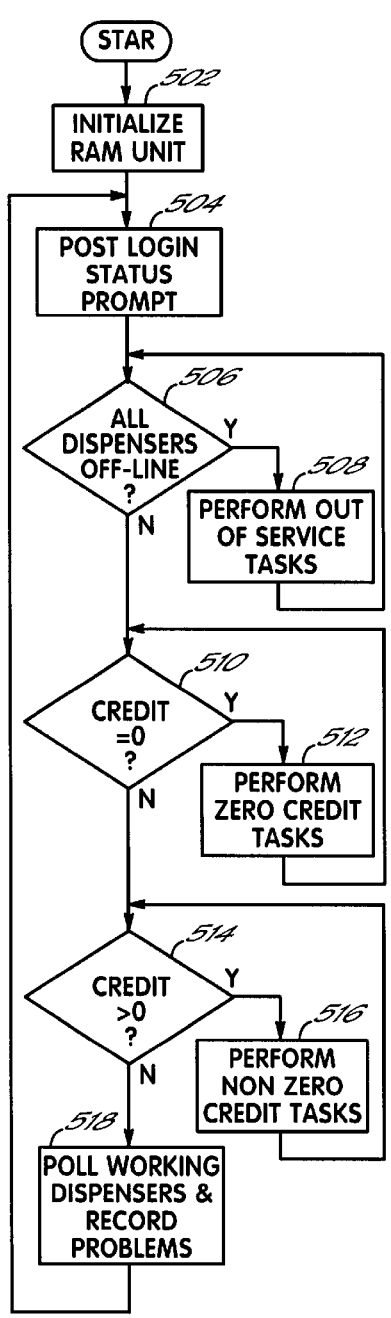
FIG. 5 is a flow chart illustrating an item dispensing portion of the operation of the retailer access module in accordance with the principles of the present invention.

In use, the first operation is to apply power to the system. Referring to FIGS. 3 and 5, when power is supplied to the ticket dispensing system 29, the retailer access module 38 at 502 performs a self-initialization as well as providing data for initializing other components. More specifically, the microcontroller 74 initializes or provides default values for all of the boards and components within the retailer module 38. Further, the microcontroller 74 establishes communications links over the cables 66 to the ticket dispensers 58 and customer module 48; and in the process, provides initialization and default values to those units. Utilizing the "$I^2$C-BUS" serial data protocol, the microprocessor 74 fabricates packets of data and transfers them to, and receives packets of data from, the customer module 38 and the ticket dispensers 58. The composition and transfer of the data packets is in accordance with the "$I^2$C-BUS" protocol. Therefore, on a regular basis, the microprocessor 74 is sending a data packet to the customer module 48 that either provides information to, or requests status information from, the customer module 48. The initialization step 502 tests other components in the system, for example, the motors within the ticket dispensers 58.

Figure 6:
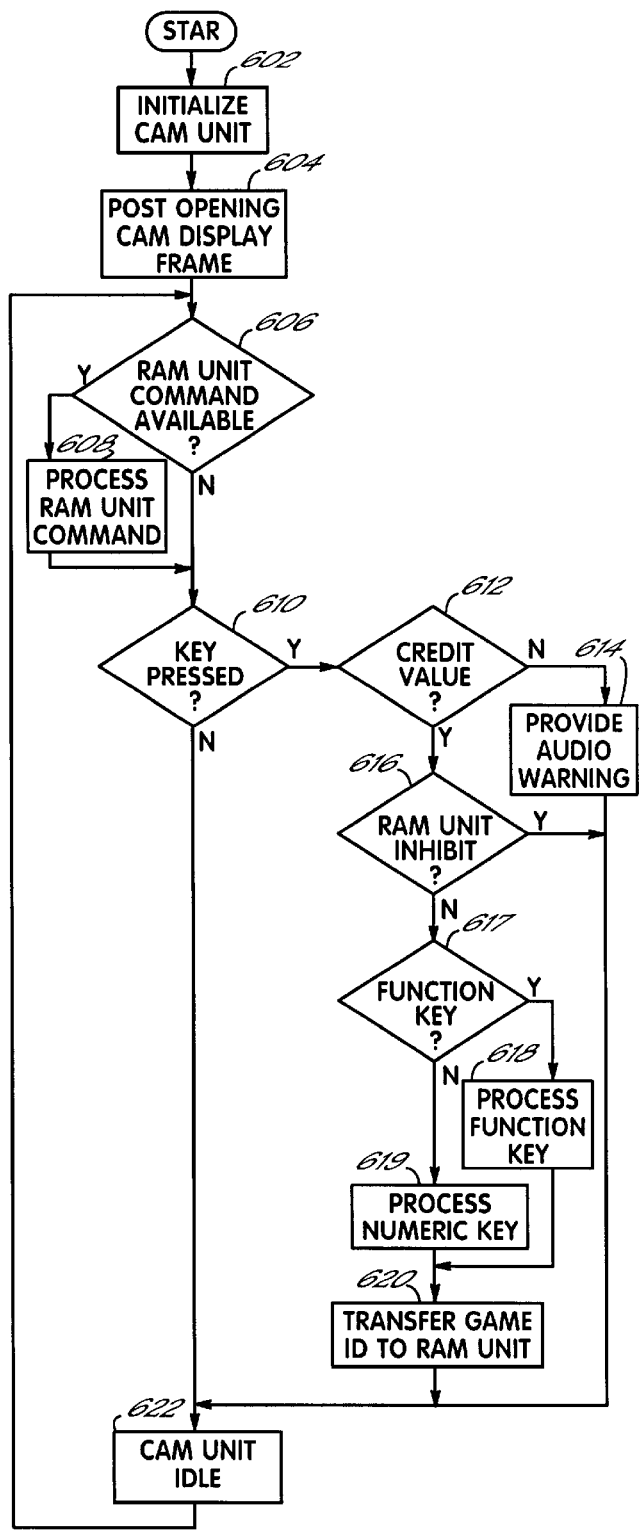
FIG. 6 is a flow chart illustrating an item dispensing portion of the operation of the customer access module in accordance with the principles of the present invention.

Referring to FIGS. 4 and 6, upon power being applied to the customer module 48, the microcontroller 96 at 602 establishes default values and otherwise initializes serial ports 90, 92, the LCD display 54 and the LED's on the keypad 49. Then at 604, the processor 96 instructs the address decoder and glue circuitry 102 to transfer an opening display frame to the LCD display module of 54. The opening message is normally a technical identification of the module 48 and provides no game related information to the customer. The microprocessor 96 takes no further action until it receives a command from the retailer module 38 as detected at 606. The processor 96 then proceeds to process the command at 608. The command from the retailer module 38 may be a part of an initialization sequence, a status request, or information with respect to ticket pricing and inventory, etc. After the first command is successfully received from the retailer module 38 and the communications link has been successfully established, the system is considered to be online and operational. At that point, the processor 96 commands the circuitry 102 to provide another message to the display 54, for example, "Play the Lottery". The customer module 48 then simply idles awaiting further commands from the retailer module 38.

Referring back to FIG. 5, after the initialization is complete, the process at 504 awaits a login by a user. The retailer access module 38 has three different levels of password security, and the different levels of security require particular or unique password configurations. In addition, the different levels of security provide different levels of access to the ticket dispensing system, for example, a clerk normally has the lowest level of security and would be able to use the system to login and logout, enter credit values, that is, customer purchase values, and print some reports. A manager or system supervisor normally has a higher level of security and correspondingly greater access to the system and, for example, may, in addition to the clerk's functions, be able to load and enter inventory and collect reports. The highest level of security providing the greatest access to the ticket dispensing system is normally reserved for service agents who have the requirement and ability to run test routines and perform system diagnostics.

Assume for purposes of this example, that a retail clerk has logged into the system at process step 504. The microprocessor 74 then at 506 checks whether all of the dispensers are off line. If any one ticket dispenser 58 continues to be online, then game ticket sales may continue. If no dispensers are online, then the microprocessor 74 moves to execute the out of service tasks at process step 508. All of the ticket dispensers 58 may be offline because no tickets are loaded, the system is undergoing maintenance, a cable 66 is broken, etc. The principal out of service task of the processor 74 is to detect when the realtime clock 76 rolls over to the next day, that is, past 12:00 a.m. When a new day starts, several accounting tasks must be performed, for example, the accounting data stored in the NOVRAM 80 must be shifted back one day. For example, the reports may be selected as being related to the current date, for example, yesterday's report, last weeks report, etc. Therefore, when the realtime clock rolls over to a new date, the accounting data associated with today must be assigned to yesterday, and after Saturday midnight, this week's data is now considered to be last week's data, etc. The microprocessor 74 continues to perform the out of service tasks at 508 until at least one dispenser 58 is brought online.

When the microprocessor 74 detects that at least one dispenser is online, the processor then checks at 510 to determine whether the current credit value is zero. In the zero credit state, the ticket dispensing system 29 is available to sell tickets, but there is no current sales activity. This state is the normal idle state for the system. If the credit is determined to be zero, the microprocessor at 512 then performs the zero credit tasks. Such tasks include checking for the entry of a password, checking for the entry of a credit and, again checking the realtime clock for a date rollover, If the processor 74 detects that a credit has been entered, the process at 514 then moves to execute the nonzero credit tasks at 516.

Figure 7:
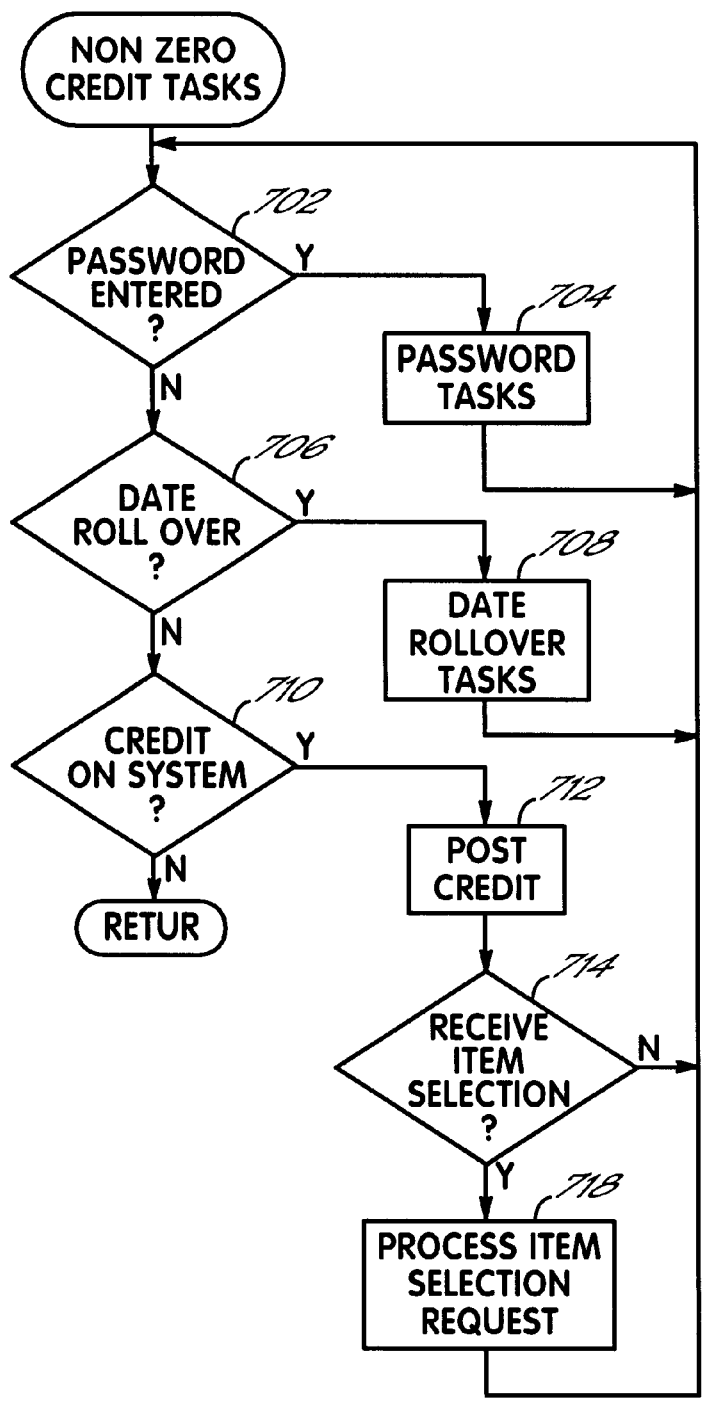
FIG. 7 is a flow chart illustrating an item dispensing portion of the operation of the retailer access module in more detail.

The major nonzero credit tasks are set forth in the flow chart of FIG. 7. As previously described, the processor at 702 detects whether another password has been entered. If so, the processor 74 then executes password tasks at 704. If not, the processor again tests at 706 whether the realtime clock has experienced a date roll over. If so, the date roll over tasks as previously described are executed at 708. If there has been no date roll over, the processor 74 determines at 710 whether there is any credit on the system, that is, whether the clerk has entered into the retailer access module 38, a credit amount equal to a payment made by a customer to purchase tickets. If a credit value is detected, the microprocessor 74 in the retailer module 38 then posts the credit at 712. In posting the credit, the microprocessor 74 enters the credit value in the NOVRAM 80 and causes the decoder and glue circuit 86 to provide an output to the display module 44 to display the credit value to the retail clerk.

In addition, the microprocessor 74 prepares a data packet including the credit value which is transferred over the cables 66. Referring to FIG. 6, the customer module receives the data packet; and at 606, the processor 96 detects the presence of the credit value transferred by the retailer module 38. The processor 96 then instructs the circuitry 102 to provide the credit value to the display 54. Upon viewing the credit amount in the display 54 of the customer module 48, the customer then knows to begin the selection of game tickets, the total value of which is to equal the displayed credit value. The customer module 48 detects at 610 whether one of the numeric keys 50 or one of the function keys 52 on the keypad 49 is being pressed by the customer. If a key actuation is detected the processor 96 then at 612 checks whether a credit value exists. If one of the game keys 50 is pressed, but the retailer module 38 has not provided the customer module 48 with a credit amount, the keystroke cannot be accepted. In this situation, the processor 96 at 614 causes the address decoder and glue circuitry 102 to provide a signal to the audio indicator 104 which, in turn, produces an audio warning tone or beep.

If a credit value exists, the processor 96 at 616 determines whether the retailer module has transmitted an inhibit command to the customer module 48. If the retailer module 38 is processing a previous keystroke from the customer module 48; and the successful processing of the keystroke depends on the operation of another device, for example, the ticket dispenser 58, the system cannot accept any additional game selections from the customer until the previous selection has been successfully processed. Therefore, immediately upon receiving a keystroke from the customer module of 48, the retailer module 38 transmits a data packet including an inhibit command back to the customer module of 48. When the retailer module 38 receives an acknowledgment from the ticket dispensers 58 indicating that a dispense ticket command has been received, the retailer module 38 then transmits a cancel inhibit command to the customer module 48. The retailer module 38 will subsequently check for a successful ticket dispensing operation.

Upon receipt of the cancel inhibit command, microprocessor 96 at 617 then determines whether the pressed key is one of the function keys 52. If so, the processor 96 at 618 processes the function key. In this example, the processor 96 commands the circuitry 102 to provide a message to the display instructing the customer to press a numeric game key, for example, "Select a Game". The process then loops through the process just described with respect to process steps 606–616; and if, at 617, a function key is not detected, the processor 96 at 619 processes the numeric key. That processing is basically to decode and identify the item or game associated with the numeric key. Thereafter, the processor 96 at 620 transfers a data packet including that game identification to the retailer module 38 in response to the next status request received from its microprocessor 74. The processor 96 then updates the credit value for the customer module 48. In updating the credit value, the processor 96 subtracts the value of the selected game ticket from the original purchase value; and instructs the circuit 102 to display the updated credit in the display 54 for the customer. The customer module 48 then at 622 returns to its idle mode in which it manages the display frames. With a credit present and being displayed, the module 48 will normally not change the state of the display.

Knowing that a credit exists, the retailer module 38 next expects to receive a keystroke from the customer module 48 representing the identity of a particular game selected by the customer. If at 714, the processor 74 detects the receipt of a game identification, it then proceeds at 718 to process the game selection request. Under normal circumstances the microprocessor 74 prepares and sends a data packet with a dispense command to an appropriate one of the dispensers 58, and also send an inhibit command data packet to the customer module 48. If the ticket is available, the one of the dispensers 58 dispenses the ticket which makes it available to the retail clerk for collection and presentation to the customer. Any irregularity in the dispensing process, for example, a jam, is detected by the dispenser 58 and a state signal representing that condition is transmitted over the cable 66 to the retailer module 38. In addition, upon receiving the dispense command, the dispenser 58 sends an acknowledgment to the retailer unit 38.

In some situations, the ticket dispenser may be empty and that zero inventory condition is transmitted back to the microprocessor 74. The microprocessor 74 then prepares a data packet for the customer module 48 that includes a game offline command indicating the zero inventory condition. The game offline may also arise because the selected dispenser 58 is down for maintenance or if there is a communication problem with the dispenser 58. Referring to FIG. 6, the microprocessor 96 detects at 606 the receipt of the game offline command, and at 608, the command is processed. Upon receipt of the game offline command, the microprocessor 96 within the customer module 48 turns OFF the LED next to one of the keys 50 on the keypad 49 that is associated with the game that is offline. In addition, the microprocessor 96 causes the address decoder 102 to provide a message to the LCD display 54 that requests the customer to "Play Another Game". In addition, the microcontroller 96 will set a state variable within the customer access module 48 that will provide the same message to the customer for subsequent depressions of that same key. That state variable remains set until the microcontroller 96 receives a command from the retailer module 38 canceling the game offline command.

Returning to process step 718 of FIG. 7, when the retailer module 38 detects that the acknowledgment to the dispense command from the ticket dispenser 58, the processor 74 sends a release inhibit command to the customer module 48. The processor 74 then iterates through the nonzero credit tasks loop and checks for a password at 702, a date rollover at 706, and a credit on the system at 710. If the value of the game selection by the customer did not utilize all of the available credit, the processor 74 calculates the remaining credit, that is, the original credit less the value of the dispensed game ticket. At 512, the updated credit value is entered in the NOVRAM 80. The process of game ticket selection by the customer and ticket dispensing continues until the microprocessor 74 determines at 510 that the credit value is zero and then returns to the process illustrated in FIG. 4. The processor 74 then proceeds at 518 to poll the working dispensers 58 and record any detected problems. The retailer and customer access modules 38, 48 continuously iterate through the processes illustrated in FIGS. 5–7 for as long as power is applied to the system. When the customer module 48 is idling at 622 of FIG. 6, the processor 96 normally causes the address decoder and glue circuitry 102 to transmit a message to the LCD display module 54 requesting the customer to "select function or game." However, if the credit is zero, the processor 96 causes the display 54 to scroll through a number of default messages. The microprocessor 96 continuously iterates through the process steps 706–714 as long as power is applied to the customer module of 48.

The above description assumed that the customer was selecting only numeric keys, however, the customer module 48 includes several function keys 52 which may be used in combination with the number keys to select the game tickets. For example, one of the function keys may be used to select a predetermined number, for example, 5, tickets. After pressing that function key, the customer is then prompted by the display 54 to press a numeric game key. Upon a game key being selected, the processor 96 then creates five game identification data packets that are then serially transmitted to the retailer module 38. Another function key may be set up to choose different preselected number, for example, 10 tickets. The third function key may be used to play all of the selected games. A fourth function key may also be utilized to randomly select the available games until the credit amount is satisfied. With each of the other function keys, after the function key is pressed, the customer then selects a game key; and the processor 96 provides game identity data packets that correspond to the function key that was selected.

To review a normal transaction, a customer at the check out counter 20, desiring to purchase game tickets, gives the cashier an amount of money equal to the purchase. The retail clerk then uses the keypad of 41 to enter the amount of the transaction, that is, the credit due the customer. The microcontroller 74 within the RAM 38 detects and identifies the keys pressed by the retail clerk, posts the amount of the credit in the NOVRAM 80, displays the credit value in the retailer module display 44 and transfers the credit value to the customer module of 48. The processor 96 within the customer module 48 displays the credit value.

If the microprocessor 74 of the retailer module 438 detects that any of the ticket dispensers are off-line or, that there is no inventory of tickets in some of the ticket dispensers, that information is stored in the NOVRAM 80; and in addition, a game off-line command is transmitted over the cable 66 to the customer module 48. The processor 96 detects a game off-line command and sets a state variable with respect to that game. In addition, the processor 96 commands the address decoder and glue circuitry 104 to turn OFF an LED 53 next to a key 50 in the keypad of 49 associated with the off-line game. Thus, the customer knows that the game is unavailable and that the key is inactive.

When the credit amount is displayed by the LCD display 54 to the customer, the customer knows that online games represented by the active keys may be selected. Upon pressing a key, the microcontroller 96 transmits the game identity to the retailer module 38, and the microcontroller 74 responds with an inhibit to the customer module 48. The processor 74 then proceeds to command the appropriate ticket dispenser to dispense the selected ticket; and upon receiving an acknowledgment to the dispense command, the processor 74 removes the inhibit from the customer module 48. Simultaneously, the microprocessor 74 recomputes the current credit value and posts the new credit value in the NOVRAM 80 as well as the retailer display 44. The processor 96 in the customer module 48 also computes an up-to-date credit value and displays the new credit value in the display 54. That process continues until the customer has selected a number of tickets that brings the credit value to zero. The retail clerk then collects the dispensed tickets from the dispensers 58 and provides the tickets to the customer.

The retailer access module 38 may also be used in association with the printer 70 to provide a wide variety of reports. The NOVRAM 80 within the module 38 maintains a complete history of ticket sales in terms of when they were sold, which game tickets were sold, the value of the game tickets, the clerk on duty, etc. Further, many reports of the history of sales can be provided, for example, sales by the shift by the day, or by the week, etc.

The item dispenser 29 of the above described invention provides a distributed, modular and scalable item dispenser that has many features making it especially suitable for point-of-sale counters. First, the present invention provides a game ticket purchase and dispensing system that is very automatic, very secure and has a high level of reporting. Thus, with the system automatically calculating the credit remaining, there should be no math mistakes. Further, the automatic dispensing should eliminate mistakes in accidentally dispensing too many tickets. With the tickets locked in their dispensers, ticket theft is minimized if not eliminated.

By making the retailer and customer modules 38, 48 and the dispensers 58 self contained, stand-alone units, the units can be located at the POS counter 20 at any convenient location. For example, the customer unit 48 may be placed on the top surface 26 of the counter 20, or the unit 48 may be placed on another support at the counter, for example, a shelf on, or next to, the counter 20. Further, the customer unit 48 may be picked up and viewed at close range as required by customers.

Similarly, the retailer module 38 may be placed on the surface 26 of the counter 20, or it may be placed on another support at the counter 20 or adjacent the POS terminal, for example, a shelf on or next to the counter 20 or cash register. In addition, the modularity of the retailer module 38 permits it to be connected directly to a retailer POS terminal 33 FIG. 2) or its functions to be integrated within the retailer POS terminal.

The stand-alone modular construction further permits a high degree of scalability. That is, a different number of dispensers can be easily added and removed from the system 29 to accommodate different numbers of items to be sold and dispensed. The only practical limitation is the maximum number of dispensers established by the system design which is a matter of design choice. In addition, the dispensers 58 may be readily located at any convenient location. While it is generally considered most convenient to have the dispensers 58 at the counter 20, they do not have to be in the proximity of the counter 20. Further, each of the dispensers 58 may be placed in different locations at the convenience of the user.

The item dispenser 29 of the present invention has a significant advantage in that by placing the system at the POS counter, the items to be sold are exposed to substantially more potential customers than is possible with existing systems. Thus, it is expected that significantly greater sales will be made.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, the serial POS printer 70 is described as having pass through ports and connected to the cables 66. However, if the POS printer 70 does not have pass through ports, it may be connected to the retailer module 38 using an RS-232 serial link. In addition, the "I$^2$C-BUS" communications protocol is used to transfer data over the cables 66; however, again, other communications protocols, for example, "CANBUS", "ESCHLON" or proprietary protocols may be used.

Further, the ticket dispensing system as described above is not interconnected with the retail POS terminal, and all communications between the ticket dispensing system and the retail system, for example, the amount of the purchase, must be entered by a retail person in both the retailer module 38 and the retailer POS cash register 33. As will be appreciated, referring to FIG. 2, the retailer access module 38 may be connected by RS-232 lines 31, 32 to the retailer POS cash register or terminal 33 and a retailer modem 34. Similarly, the retailer access module 38 may be connected by an RS-485 line 35 to a retailer multidrop network terminal 36. With the retailer module 38 in communication with the cash register 33, the amount of the purchase only has to be entered once. In addition, with that and the other communications connections mentioned above, the inventory and sales data stored in the NOVRAM 80 can be integrated into the retailer's reporting system. Further, as will be appreciated, the whole function of the retailer access module 38 may be integrated into the retailer POS terminal 33; and in that embodiment, the retail module 38 will not exist as a separate unit.

The system disclosed in FIGS. 1 and 2 provide a passive display panel 30 and a separate customer unit 48 having a number of keys corresponding to the games presented in the display unit 30. As will be appreciated, the displays in the panel 30 can be individually made active, so that they respond to actions by the customer in selecting a game. In that embodiment, the display panel has the same capabilities as the numeric keys 50. In addition, and in a similar manner, the function keys 52 may also be integrated into the display panel 30. As will be appreciated, the components of the item dispenser 29 may installed in an existing counter, or alternatively, the components may be installed in a counter module that is a complete dispensing system and installed as a complete POS counter unit. In a further embodiment, the passive display 30 need not be used, and instead, the items are displayed and selected using only the keys 50 of the customer module 48.

Even though the item dispenser 29 has a substantial ticket inventory and sales reporting capability, if the retailer has a number of item dispensers, those reports must be manually collected from each of the machines which is labor intensive, time consuming and expensive. In addition, retailers are required to provide those reports to a central administrative agency, for example, a state lottery commission, which again is labor intensive, expensive and subject to error caused by misplaced or lost reports, etc. Further, each of the item dispensers must be serviced on an individual basis. For example, password lists which are replicated in each of the dispensers must be properly maintained to provide for new, modified and deleted entries. Such a task, done repeatedly for each individual machine or system of item dispensers is labor intensive, tedious and expensive.

Figure 8:
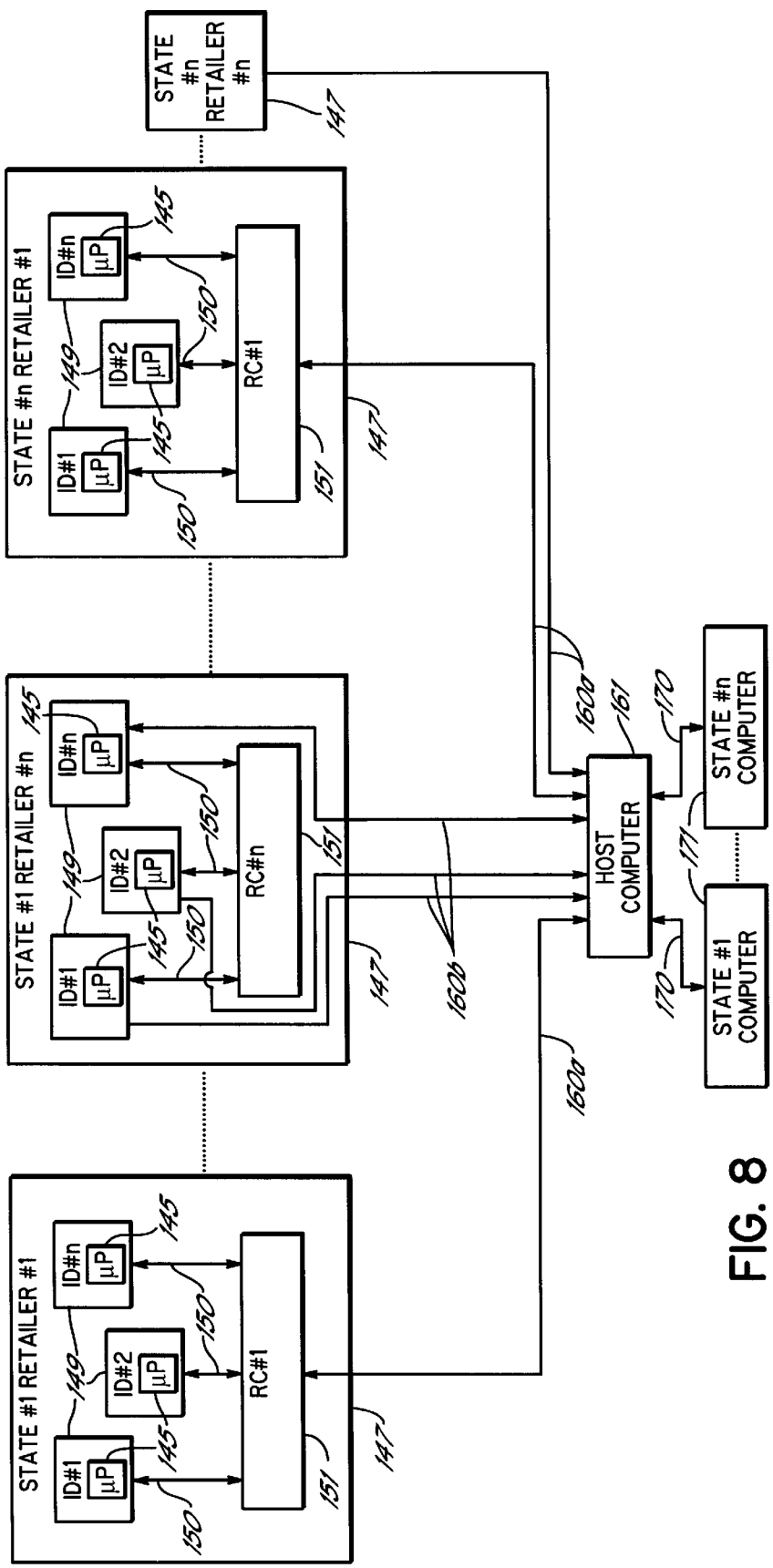
FIG. 8 is a schematic block diagram of another embodiment of the invention that facilitates a reporting function with respect to the item dispenser.

A more efficient, automatic and timely reporting capability is provided by a further embodiment of the invention as illustrated in FIG. 8. Item dispensers 149 are often supplied by a vendor via a commercial sale or lease to a client or customer of the vendor, for example, a state authority. The client then provides the item dispensers 149 to different retail locations 147 that are collectively associated with that client. The item dispensing system of the vendor may have item dispensers for many different items that can be compactly stored in bulk, for example, lottery tickets or other types of tickets, phone cards, stamps, cards or any other items capable of being relatively compactly inventoried and automatically dispensed. Thus, for purposes of this description, a client of the vendor is any entity that uses a group of the vendor's item dispensers for dispensing items, and the described distribution of lottery ticket dispensers by a state authority to retailer locations within the state is only one example of a client and an item dispensing system.

In the transaction between the vendor of the item dispensers 149 and its client, the vendor may contract with its client, for example, the state authority, to maintain and service the item dispensers 149 at the various retailer locations 147. Further, such a service contract may exist with different clients, for example, different state authorities, State#1 . . . State#n. In this embodiment, to facilitate that service obligation, the vendor establishes a wired or wireless bidirectional communications link 160 between a host computer 161 under the control of the vendor and the item dispensers 149, at the various retailer locations 147 associated with different clients, for example, different states, State#1 . . . State#n. Further, in this embodiment, a bidirectional communications link 170 is also established between the vendor's host computer 161 and client computers 171, for example, computers that are used or controlled by a client such as one or more state authorities, State#1 Computer . . . State#n Computer.

In the description herein, host computer 161 is described as being a computer used by a vendor of the item dispensers. Further, the state computers 171 are described as being computers used by clients of a vendor of the item dispensers; however, as will be appreciated, those commercial relationships are illustrative and are not to be considered a limitation on the scope of the invention. The host computer as recited in the claims can be any computer that exchanges data with item dispensers regardless of the commercial relationship of the user of the host computer to the vendor of the item dispensers. Further, the client computer as recited in the claims can be any computer that exchanges data relating to the item dispensers with the host computer regardless of the commercial relationship of the user of the client computer to the vendor of the item dispensers.

In the specific example illustrated in FIG. 8, in a first state, for example, State #1, a plurality of retail locations 147, for example, Retailer #1 . . . Retailer #n, each have a plurality of item dispensers 149, for example, ID #1 . . . ID #n. The item dispensers 149 may be the item dispensers 29 (FIG. 1) described earlier herein, a clerk facilitated item dispensing unit such as that described in U.S. Pat. No. 4,982,337, a stand-alone item dispensing machine or any other item dispenser that is known in the art, or any combination of such item dispensers. However, it is required that each of the item dispensers 149 of FIG. 8 have a dispenser computer or microprocessor 145, for example, referring to FIG. 3, the microcontroller 74 within the retailer module 38. In addition, each item dispenser must have a communications port, for example, referring to FIG. 2, a retailer modem 34 or a retailer multidrop network terminal 36. As an alternative to a wired communications link, the port may be implemented using an RF or other wireless communications technology. Similar groupings of item dispensers, ID #1 . . . ID #n, are also located at a plurality of retailer locations, Retailer #1 . . . Retailer #n, in one or more other states, State #n.

In the embodiment of FIG. 8, each of the retailer locations 147 have respective retailer computers 151, and each of the retailer computers 151 is connected to microprocessors 145 within the item dispensers 149 at a respective retail location by a wired or wireless bidirectional communications link 150 that conforms to the communications port on each of the item dispensers 149. The frequency with which data is transferred between the item dispensers at each retailer location 147 and a respective retailer computer 151 is dependent on the computer resources and the number of item dispensers at each retailer location 147, the expected sales volume of the item dispensers 149, etc. Thus, reporting data may be transferred from an item dispenser to the retailer computer 151 on a batch basis, for example, once each shift, one or more times each day or at some other interval. Alternatively, data may be transferred from an item dispenser to the retailer computer 151 in real time in response to each item dispenser transaction.

Thus, by whatever mode of data transfer is selected, each of the retailer computers 151 is able to collect and store data and provide desired reporting for each of the item dispensers 149 connected thereto as well as consolidate data to provide consolidated reports for groups of item dispensers. Such consolidated reporting is useful in providing financial reports to a client, for example, a state authority such as a supervising lottery commission. Consolidated reports can also assist a retailer in maintaining the appropriate ticket inventory. Further, individual item dispensers 149 can be serviced from a retailer computer 151 connected thereto. Thus, for example, password lists can be easily updated from a single, secure location, that is, the retailer computer 151.

The host computer 161 is normally at a location geographically remote from the retailer locations 147. As will be appreciated, the schematic showing of a host computer 161 in FIG. 8 is understood to be either a single computer or a plurality of host computers. The plurality of host computers may be a number of stand-alone computers dedicated to a particular one, or a group of, states; or the plurality of host computers may connected into a network of computers or implemented in another configuration. In some applications, a bidirectional communications link may directly connect the host computer 161 to a retailer computer 151 as shown by the communications link 160a between the host computer 161 and the retailer computer, RC #1 at Retailer #1 in State #1. With this embodiment, the retailer computer 151 may collect and store data therein or, collect data from the item dispensers and immediately transfer that data to the host computer 161. Alternatively, a bidirectional communications link 160b may connect the host computer 161 to the microprocessors 145 in each of the item dispensers 149 as shown by the communications links between the host computer 161 and the item dispensers, ID #1 . . . ID #n at Retailer #n in State #1.

As will be appreciated, any type and combination of communications links may be established between the various retailer locations 147 and the host computer 161. The choice of a configuration of one, or a combination of, communications links will depend on many factors such as the availability of different communications resources, their respective costs, etc. Such communications links may be a commercial telephone link, an Internet link, a cable link, a satellite link, etc. The selection of a communications link configuration and the frequency of data transmissions to the host computer will also depend on previously described factors, for example, the number of item dispensers 149 at a location, their level of activity, the requirements of the retailer and the state authority, etc.

As previously described with respect to the retailer computer 151, the host computer 161 stores transmitted data in a database and provides individual item dispenser reports or consolidated reports relating to items dispensed, sales dollars, item inventory, etc., as desired. Most often, the client or state computers 171 are at locations geographically remote from the host computer 161 and the retailers. The choice of a communications link configuration between the host computer 161 and the state computer 171 will depend on many of the same factors previously described with respect to the communications link 160 between each of the retailer locations 147 and the host computer 161.

Figure 9:
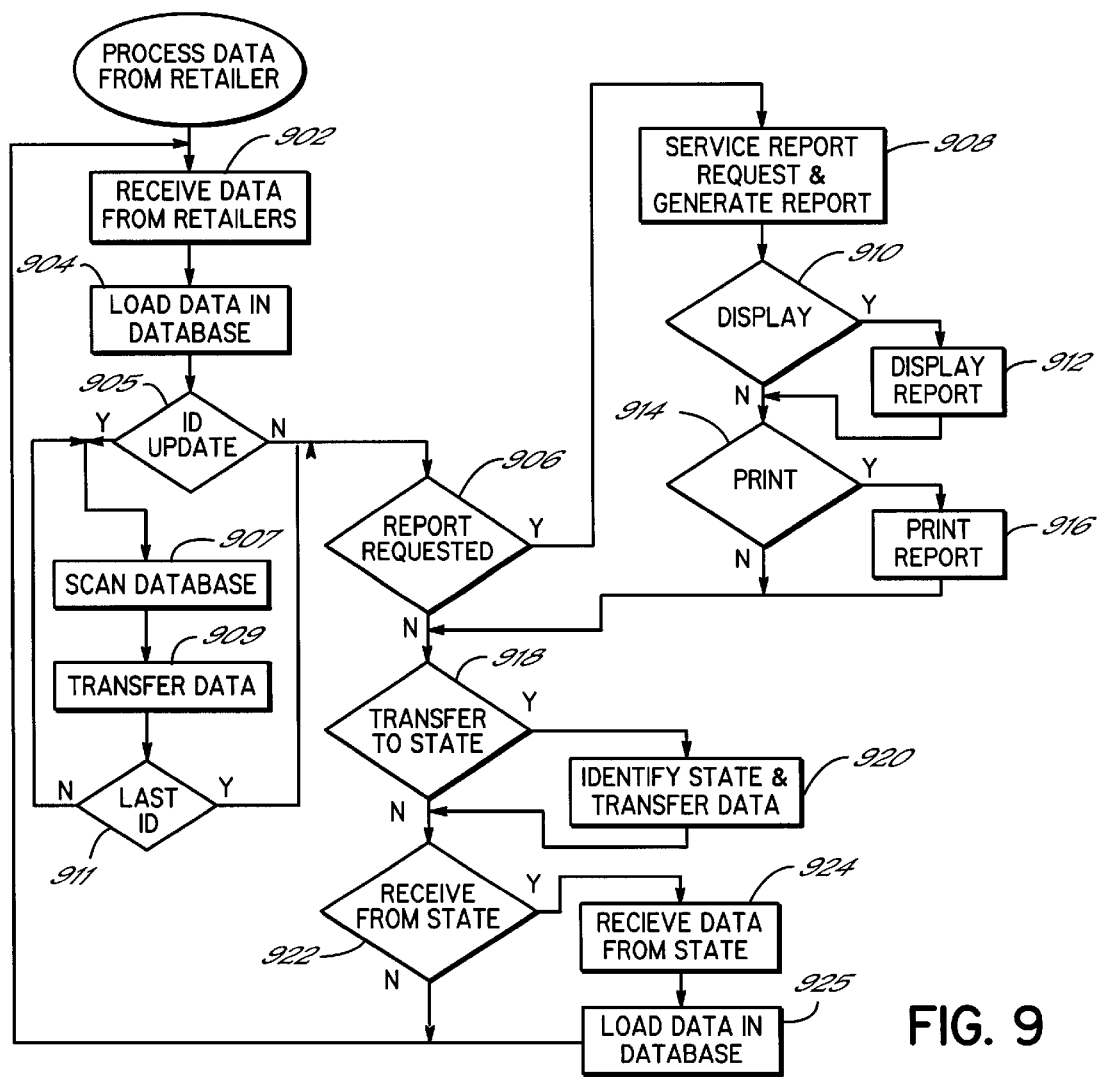
FIG. 9 is a flow chart of a process executed by a host computer within the embodiment of FIG. 8.

In use, referring to FIG. 9, the host computer 161, at 902, first receives data relative to one or more item dispensers 149 from one or more retailer locations 147 over respective communications links. As previously indicated, such data can be transmitted either on a transaction-by-transaction basis or on a batch basis. Further, if necessary, priorities may be assigned to the different retailers so that the host computer 161 processes the more urgent data first. At 904, the host computer 161 loads the data relating to one or more of the retailer's item dispensers 149 into a database store within the host computer 161. If communicating on a batch basis, communications between any one of the retailer computers 151 and the host computer 161 is initiated by either of those computers. After the data is received from a particular retailer, if, at 905, none of the item dispensers is to be updated with data from the state, as will subsequently be described, the communications with that retailer are terminated. The host computer 161 operates on a continuing basis to collect data and maintain its database with the most current information from all of the item dispensers 149. The host computer 161, at 906, detects whether a request for a report has been generated. A report request may be generated by the vendor or another entity as will be described.

A report request is serviced by the host computer 161 at 908. As part of the database reporting function within the host computer 161, an electronic file of the requested report is generated. As previously described, the host computer is controlled by the vendor of the item dispensers, and a report request may be generated by the vendor. Further, the vendor may request that such report be displayed, printed or transmitted to another location. If a display request is detected, at 910, the generated report is displayed at 912. Similarly, a print request detected by the host computer 161, at 914, results in the host computer causing the report to be printed at 916. As will be appreciated, the report may be printed at the location of the host computer, or the host computer can cause the report to be printed at a location remote from the host computer.

The embodiment of FIG. 8 permits data relating to the item dispensers 149 at the various retail locations connected to the host computer 161 to be transferred to a client computer associated with a state authority. Thus, after servicing a report request or in the absence of a report request, the host computer 161 detects, at 918, a request to transfer data to the state authority. Such a request may be generated manually by the vendor or the state or, may be created automatically in response to a calendar/clock within the host computer, a time interval since the last data transfer, the detection of some operating condition of one or more item dispensers 149, etc. The host computer, at 920, services that request. The particular state authority is identified, and the fields of data associated with that state authority are identified and packaged for transmission to an appropriate one of the state computers 171. The host computer 161 collects a large amount of data relating to the operation of the item dispensers 149, however, not all of that data is required by each of the state authorities, and some of the data collected is for the exclusive use of the vendor and not required by any of the state authorities. The host computer identifies the state authority requesting the information, retrieves the data required by that state and transfers the data to the client computer associated with that state authority. That data is then used by the state authority to create reports relating to the dispensing of items, restocking of item inventories, etc.

With this embodiment, the state authority is able to transmit data to individual item dispensers 149 at selected retail locations. For example, some item dispensers have electronic displays that provide messages associated with the dispensing of items. From time to time, the state authority may wish to modify the content of those messages; and thus, the state authority transmits new messages to the item dispensers via the vendor's host computer. In those applications, the host computer 161, at 922, determines whether it has received a request to accept data from a state computer 171. If so, the host computer, at 924, receives data from the state computer which includes the text of a new message and the state identification number of item dispensers 149 that are to display the message. The host computer then at 925 loads that data in the database memory within the host computer 161 and sets an "ID Update" flags for each of the different item dispensers identified by the data received from the state.

During a subsequent iteration through the process of FIG. 9, each time a communications link is established with a retailer, the host at 905 checks the status of the "ID Update" flags to determine whether any data is waiting to be transferred to an item dispenser. If any of the "ID Update" flags is set, then at 907, the host computer scans the database to identify whether any of the set "ID Update" flags correspond to item dispensers 149 at the retailer with which the communications link 160 is currently established and active. If an "ID Update" flag corresponds to an item dispenser at the retailer with which communications are active, the host computer 161 at 909 proceeds to transfer data in the database associated with that item dispenser over the communications link 160 to a respective retailer computer 151. Thereafter, the host computer resets the "ID Update" flag for that item dispenser, and at 911, checks whether that was the last item dispenser to be updated. If not, the process again at 907 scans the database for other set "ID Update" flags. If none are found for the item dispensers 149 at the current retailer location 147 with which communications is active. a "Last ID" flag is set. That flag is detected at 911, is reset and the process checks for a report request at 906 as previously described. The data at the retailer computer 151 may be passed immediately to the appropriate item dispenser, or the data may be buffered in the retailer computer 151 for a later transfer to the item dispenser. Thereafter, the new message is then displayed on the electronic message displays of those item dispensers 149 identified by the state. The host computer 161 then iteratively executes the process of FIG. 9 as described above. A new text message is only one example of data that may be transferred from the state to individual item dispensers 149 at retail locations; and as will be appreciated, any other item dispenser data can be transferred from the state to a desired item dispenser.

Thus, with this embodiment, the vendor's host computer 161 of FIG. 8 has all of the information necessary to fulfill most, if not all, of the reporting requirements of each of the item dispensers 149 at various retail locations in one or more states. As will be appreciated, the host computer can transmit the raw data collected from the item dispensers to the state computers 171, or the host computer 161 can perform some processing of the data and transmit that processed data to the state computers. Further, the host computer 161 can prepare state specified reports using the collected data and transmit that data to the state computers. In addition, any communications with the state computers 171 can occur either on a transaction-by-transaction basis or, on a batch reporting basis, as the parties desire.

The embodiment of FIG. 8 has several advantages over known systems. First, the vendor's service obligations with the state authority may make it feasible for the vendor to provide a host computer 161 and establish a communications link between the retail locations and the host computer. The existence of such connections gives the vendor access to all of the data required to be reported to the state authority by the retailers. Further, the vendor is connected to a large number of retailer locations 147 and an even larger number of item dispensers 149; and therefore, the overhead costs of handling the data collection and reporting of the retailers can be spread thereover. Thus, the embodiment of FIG. 8 provides certain efficiencies heretofore unavailable.

Second, with the embodiment of FIG. 8, the communications between the retailer and the state authorities is, for all practical purposes, in real time and much faster than the current reporting systems in which reports are printed by the retailers and mailed or sent to the state authorities by courier. Having more current information permits the state authorities to more quickly audit the operations of the retailers and generate their own financial reports. The faster financial reporting should permit the state authorities to more quickly settle their financial accounts with the retailers. In addition, the better reporting will allow a more rapid response to low item inventories that may be detected. As in any business, more current, accurate information provides an opportunity for a more accurate analysis of current operations, more accurate predictions and a more efficient operation overall.

Therefore, the invention in its broadest aspects is not limited to the specific details shown and described. Consequently, departures may be made from the details described herein without departing from the spirit and scope of the claims which follow.

What is claimed is:

1. An item dispensing system comprising:
    a plurality of item dispensers at different retail locations, the item dispensers having respective processors for independently operating the item dispensers and providing data relating to items dispensed by the item dispensers;
    a host computer located geographically remotely from the retail locations and in electrical communications with the processors for receiving and storing the data relating to the items dispensed by the item dispensers;
    a first other computer located geographically remotely from the retail locations and the host computer, the first other computer in electrical communications with the host computer and receiving data relating to items dispensed by item dispensers at a first retail location; and
    a second other computer located geographically remotely from the retail locations, the host computer and the first other computer, the second other computer in electrical communications with the host computer and receiving data relating to items dispensed from item dispensers at a second retail location.

2. The item dispensing system of claim 1 further comprising a retailer computer located at the first retail location, the retailer computer being in electrical communications with first processors of first item dispensers at the first retail location, the retailer computer receiving from the first processors data relating to items dispensed from the first item dispensers.

3. An item dispensing system comprising:
    a plurality of item dispensers at different retail locations, the item dispensers having respective processors for independently operating the item dispensers and providing data relating to items dispensed by the item dispensers;
    a retailer computer located at a first retail location, the retailer computer being in electrical communications with first processors of first item dispensers at the first retail location, and the retailer computer receiving data from the first processors relating to items dispensed from the first item dispensers;
    a host computer in electrical communications with the retailer computer at the first retail location which receives and stores the data relating to the items dispensed from the first item dispensers; and a first other computer in electrical communications with the host computer which receives data relating to items dispensed from item dispensers at the first retail location.

4. The item dispensing system of claim 3 further comprising:

the host computer being in electrical communications with a processor of a second item dispenser at a second retail location for receiving and storing data relating to items dispensed from the second item dispenser; and a second other computer in electrical communications with the host computer for receiving data relating to items dispensed from the second item dispenser at the second retail location.

5. An item dispensing system comprising:

an item dispenser at a first retail location, the item dispenser having
   a processor for independently operating the item dispenser and providing data relating to items dispensed by the item dispenser, and
   a display for playing a message relating to the items dispensed by the item dispenser;

a host computer in electrical communications with the processor at the first retail location, the host computer receiving and storing the data relating to the items dispensed by the item dispensers; and a first other computer in electrical communications with the host computer which receives the data relating to items dispensed from item dispensers at a first retail location, the first other computer originating a second message relating to the items being dispensed the first other computer transferring the second message to the host computer, the host computer transferring the second message to the processor, and the processor playing the second message on the display.

6. An item dispensing system comprising:

a plurality of item dispensers located at a first retail location;

a plurality of processors located at the first retail location, each of the plurality of processors electrically connected to one of the plurality of item dispensers for independently operating the item dispensers and providing first data relating to items dispensed from a respective one of the plurality of item dispensers;

a retailer computer located at the first retail location and in electrical communications with the plurality of processors, the retailer computer receiving and storing the first data relating to the items dispensed from the plurality of item dispensers;

a second item dispenser located at a second retail location;

a second processor located at the second retail location and electrically connected to the second item dispenser, the second processor receiving and storing second data relating to items dispensed from the second item dispenser;

a host computer in electrical communications with the retailer computer and the second processor, the host computer receiving and storing the first and second data relating to the items dispensed from the plurality of item dispensers and the second item dispenser, respectively; and another computer in electrical communications with the host computer which receives and stores the first and second data relating to the items dispensed from the plurality of item dispensers and the second item dispenser, respectively.

7. An item dispensing system comprising:

a plurality of retailer units placed at respective point-of-sale counters at different retail locations, each of the retailer units having an input device adapted to permit a retailer to independently process an item selection made by a customer through an input device of a customer unit at a respective point-of-sale counter and provide data relating to items dispensed;

a plurality of item dispensers placed at the different retail locations, each of the plurality of item dispensers being in electrical communication with a respective one of the retailer units and dispensing an item in response to the retailer unit processing the item selection made by the customer; and a host computer located geographically remotely from, and in electrical communications with, the plurality of retailer units, the host computer receiving from the plurality of retailer units data relating to the items dispensed.

8. The item dispensing system of claim 7 further comprising another computer in electrical communications with the host computer for receiving from the host computer the data relating to the items dispensed.

9. The item dispensing system of claim 7 further comprising a retailer computer in electrical communications with first retailer units and the host computer, the retailer computer receiving and forwarding to the host computer first data from the first retailer units relating to the items dispensed by first item dispensers in electrical communications with the first retail units.

10. The item dispensing system of claim 7 further comprising a customer unit at the point-of-sale counter and having an input device adapted to permit the customer to select an item for purchase.

11. A lottery ticket dispensing system comprising:

first lottery ticket dispensers located at a first retail location;

first processors located at the first retail location, the first processors electrically connected to respective ones of the first lottery ticket dispensers for independently operating the lottery ticket dispensers and providing first data relating to lottery tickets dispensed from the first lottery ticket dispensers;

a first retailer computer located at the first retail location and in electrical communications with the first processors, the first retailer computer receiving and storing the first data relating to lottery tickets dispensed from the first item dispensers;

second lottery ticket dispensers located at a second retail location;

second processors located at the second retail location, the second processors electrically connected to respective ones of the second lottery ticket dispensers for receiving and storing second data relating to lottery tickets dispensed from the second lottery ticket dispensers;

a second retailer computer located at the second retail location and in electrical communications with the second processors, the second retailer computer receiving and storing the second data relating to lottery tickets dispensed from the second item dispensers;

a host computer in electrical communications with the first and second retailer computers, the host computer receiving and storing the first and second data relating to the lottery tickets dispensed from the first and second item dispensers, respectively; and another computer in electrical communications with the host computer which receives and stores the first data relating to the lottery tickets dispensed from the first lottery ticket dispensers.

12. The lottery ticket dispensing system of claim 11 further comprising at least one further computer located geographically remote from the other computer, the retail locations and the host computer, the further computer in electrical communications with the host computer for receiving the second data relating to lottery tickets dispensed at the second lottery ticket dispensers.

13. An item dispensing system comprising:
- a first retailer unit placed at a first point-of-sale counter at a first retail location, the first retailer unit having an input device adapted to permit the first retailer unit to independently process an item selection made by the customer and provide first data relating to an item dispensed;
- a first item dispenser at the first retail location and in electrical communication with the first retailer unit, the first item dispenser dispensing an item in response to the first retailer unit processing an item selection made by a customer;
- a second retailer unit placed at a second point-of-sale counter at a second retail location, the second retailer having an input device adapted to permit a retailer to process an item selection made by a customer and provide second data relating to items dispensed;
- a second item dispenser at the second retail location and in electrical communication with the second retailer unit, the second item dispenser dispensing an item in response to the second retailer unit processing the item selection made by a customer;
- a host computer in electrical communications with the first and second retailer units which receives the first and second data relating to the items dispensed; and
- another computer in electrical communications with the host computer which receives from the host computer the first data relating to the items dispensed at the first retail location.

14. The item dispensing system of claim 13 further comprising at least one further computer geographically remote from the other and host computers and the retail locations, the further computer in electrical communications with the host computer for receiving second data relating to items dispensed at the second retail location.

* * * * *

UNITED STATES PATENT AND TRADEMARK OFFICE
CERTIFICATE OF CORRECTION

PATENT NO.      : 6,351,688 B1
DATED           : February 26, 2002
INVENTOR(S)     : David F. Nichols, Joseph C. Perin, Jr. and David G. Wagoner It is certified that error appears in the above-identified patent and that said Letters Patent is hereby corrected as shown below:

Column 1,
Line 4, "now 6,038,492" should read -- now U.S. Patent No. 6,038,429 --.

Column 19,
Line 34, "being dispensed the" should read -- being dispensed, the --.

Signed and Sealed this

Third Day of December, 2002

JAMES E. ROGAN
*Director of the United States Patent and Trademark Office*